United States Patent
Zhang et al.

(10) Patent No.: US 12,377,826 B2
(45) Date of Patent: Aug. 5, 2025

(54) SLOPE BRAKE PRESSURE DETERMINING METHOD AND DETERMINING SYSTEM, AND VEHICLE

(71) Applicant: NIO TECHNOLOGY (ANHUI) CO., LTD, Hefei (CN)

(72) Inventors: Xianhui Zhang, Hefei (CN); Bohong Xiao, Hefei (CN); Shan Zou, Hefei (CN); Da Yuan, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 410 days.

(21) Appl. No.: 17/690,228

(22) Filed: Mar. 9, 2022

(65) Prior Publication Data
US 2022/0289153 A1 Sep. 15, 2022

(30) Foreign Application Priority Data
Mar. 11, 2021 (CN) .......................... 202110265017.X

(51) Int. Cl.
*B60T 8/171* (2006.01)
*B60T 17/22* (2006.01)

(52) U.S. Cl.
CPC ............ *B60T 8/171* (2013.01); *B60T 17/221* (2013.01); *B60T 2210/20* (2013.01);
(Continued)

(58) Field of Classification Search
None
See application file for complete search history.

(56) References Cited

U.S. PATENT DOCUMENTS

| 2008/0086253 A1* | 4/2008 | Nakayama | B60T 7/122 701/80 |
| 2017/0166210 A1* | 6/2017 | Kim | B60W 30/18027 |

FOREIGN PATENT DOCUMENTS

| CN | 104590272 | 5/2015 |
| CN | 110341715 | 10/2019 |

(Continued)

OTHER PUBLICATIONS

Extended Search Report for European Patent Application No. 22160732.8, dated Jul. 25, 2022, 8 pages.
(Continued)

*Primary Examiner* — Christian Chace
*Assistant Examiner* — Shayne M. Gilbertson
(74) *Attorney, Agent, or Firm* — Sheridan Ross P.C.

(57) ABSTRACT

The invention relates to a slope brake pressure determining method and system. The method includes: a pre-braking slope estimated value is determined according to a specified cycle, where a current pre-braking slope estimated value is determined and is used as a first slope estimated value $a_{estimate1}$, and a pre-braking slope estimated value of a previous cycle that is latched prior to the establishment of brake pressure is used as a second slope estimated value $a_{estimate2}$; an instantaneous vehicle speed $v_{brake}$ prior to the establishment of the brake pressure is latched, a vehicle traveling distance $l_{brake}$ and time $t_{brake}$ are accumulated, and an in-braking slope estimated value $a_{slop}$ is determined based on the instantaneous vehicle speed $v_{brake}$, the vehicle traveling distance $l_{brake}$, and the time $t_{brake}$; and pre-braking pressure p1 and in-braking pressure p2 are determined based on the second slope estimated value $a_{estimate2}$ and a third slope estimated value $a_{estimate3}$, respectively, initial brake pressure p3 is determined based on the pre-braking pressure p1 and the in-braking pressure p2, and final brake pressure p4 is determined based on the initial brake pressure p3.

(Continued)

According to the invention, the brake pressure can be accurately determined.

11 Claims, 2 Drawing Sheets

(52) U.S. Cl.
CPC ....... *B60T 2220/04* (2013.01); *B60T 2240/00* (2013.01); *B60T 2250/00* (2013.01); *B60T 2250/04* (2013.01); *B60T 2270/88* (2013.01)

(56) References Cited

FOREIGN PATENT DOCUMENTS

| | | | |
|---|---|---|---|
| CN | 111731308 | 10/2020 | |
| CN | 112113774 | 12/2020 | |
| CN | 112249024 | 1/2021 | |
| DE | 102013216667 | 3/2014 | |
| DE | 102013216667 A1 * | 3/2014 | .......... B60W 40/076 |
| DE | 102015219554 | 4/2017 | |
| DE | 102015219554 A1 * | 4/2017 | ............. B60T 8/172 |
| EP | 0972971 * | 1/2000 | |
| WO | WO 2012/138286 | 10/2012 | |
| WO | WO-2012138286 A1 * | 10/2012 | ............. B60T 8/172 |

OTHER PUBLICATIONS

Official Action with Machine Translation for China Patent Application No. 202110265017.X, dated May 25, 2024, 9 pages.

\* cited by examiner

SLOPE BRAKE PRESSURE DETERMINING METHOD AND DETERMINING SYSTEM, AND VEHICLE

CROSS-REFERENCE TO RELATED APPLICATION

This application claims the benefit of China Patent Application No. 202110265017.X filed Mar. 11, 2021, the entire contents of which are incorporated herein by reference in its entirety.

TECHNICAL FIELD

The invention relates to vehicle control technologies, and specifically to a slope brake pressure determining method and determining system for braking on a slope.

BACKGROUND ART

In vehicle control for driver assistance, vehicle motion control needs to cover a variety of road conditions, among which slopes are the most common road conditions. The inaccurate calculation of brake pressure on a slope and brake pressure retained during parking leads to excessive braking or slipping on the slope due to insufficient braking force.

At present, the commonly used algorithm is comparing a measured value of vehicle body acceleration with a calculated value of wheel speed acceleration to determine a slope, thereby calculating brake pressure. However, a problem with this method is that a vehicle body acceleration sensor fluctuates greatly when a vehicle is moving and during the starting and parking process of the vehicle, and the calculation of the wheel speed acceleration is inaccurate at low speed, which leads to unreasonable determination of the brake pressure.

Therefore, it is necessary to develop a slope brake pressure algorithm to ensure accurate and reasonable determination of brake pressure under different working conditions, and to improve the driving experience of driver assistance.

SUMMARY OF THE INVENTION

In view of the foregoing problem, the invention is to propose a slope brake pressure determining method and a slope brake pressure determining system, so as to accurately determine brake pressure.

A slope brake pressure determining method according to an aspect of the invention includes:
- a pre-braking slope determining step, in which a pre-braking slope estimated value is determined according to a specified cycle, where vehicle acceleration $a_{wheel}$ is determined based on a current vehicle speed, a slope measured value $a_{measure}$ is obtained based on a measured value of the vehicle acceleration, and a current pre-braking slope estimated value is determined based on the vehicle acceleration $a_{wheel}$ and the slope measured value $a_{measure}$ and is used as a first slope estimated value $a_{estimate1}$, and where a pre-braking slope estimated value of a previous cycle that is latched prior to the establishment of brake pressure is used as a second slope estimated value $a_{estimate2}$;
- an in-braking slope determining step, in which an instantaneous vehicle speed $v_{brake}$ prior to the establishment of the brake pressure is latched, a vehicle traveling distance $l_{brake}$ and time $t_{brake}$ are accumulated, and an in-braking slope estimated value $a_{slop}$ is determined based on the instantaneous vehicle speed $v_{brake}$ prior to the establishment of the brake pressure and the vehicle traveling distance $l_{brake}$ and time $t_{brake}$, where the instantaneous vehicle speed $v_{brake}$ is an instantaneous vehicle speed when the brake is applied, and the vehicle traveling distance $l_{brake}$ and time $t_{brake}$ are a vehicle traveling distance and time that have been accumulated from a moment at which the brake is applied; and
- a brake pressure determining step, in which pre-braking pressure p1 and in-braking pressure p2 are determined based on the second slope estimated value $a_{estimate2}$ and a third slope estimated value $a_{estimate3}$, respectively, initial brake pressure p3 is determined based on the pre-braking pressure p1 and the in-braking pressure p2, and final brake pressure p4 is determined based on the initial brake pressure p3, where the third slope estimated value $a_{estimate3}$ is a slope estimated value determined using an observer.

Optionally, in the pre-braking slope determining step, the first slope estimated value $a_{estimate1}$ is determined according to the following formula (1):

$$a_{estimate1} = a_{measure} - a_{wheel} \qquad \text{Formula (1)},$$

in the in-braking slope determining step, the in-braking slope estimated value $a_{slop}$ is determined according to the following formula (2):

$$a_{slop} = a_{brake} - (l_{brake} - v_{brake} * t_{brake})/(0.5 * t_{brake} * t_{brake}) \qquad \text{Formula (2)},$$

where $a_{brake}$ is acceleration formed by a braking force, and the acceleration $a_{brake}$ formed by the braking force is calculated based on brake pressure, braking efficiency, a vehicle radius, and a vehicle weight; and in the brake pressure determining step, the initial brake pressure p3 is obtained according to the following formula (4):

$$p3 = \max\{p1, p2\} \qquad \text{Formula (4), and}$$

the final brake pressure p4 is obtained according to the following formula (5):

$$p4 = p3 + \Sigma p_{detal} \qquad \text{Formula (5)},$$

where $\Sigma p_{detal}$ is a specified variable.

Optionally, in the pre-braking slope determining step, the current vehicle speed is obtained from a wheel speed sensor, and the measured value of the vehicle acceleration is obtained from a vehicle body acceleration sensor and undergoes second-order filtering to obtain the slope measured value $a_{measure}$.

Optionally, in the pre-braking slope determining step, on the premise of identifying a braking condition, the pre-braking slope estimated value of the previous cycle, namely the second slope estimated value $a_{estimate2}$, is latched prior to the establishment of the brake pressure,
where identifying the braking condition includes identifying according to stop and deceleration commands from a vehicle brake switch or a vehicle main controller.

Optionally, in the in-braking slope determining step, the instantaneous vehicle speed $v_{brake}$ is obtained from a wheel speed sensor, the vehicle traveling distance $l_{brake}$ is obtained by integration on the wheel speed sensor, the time $t_{brake}$ is obtained by timing, and the acceleration $a_{brake}$ formed by the braking force is obtained according to the following formula (6):

$$a_{brake} = \text{Brake pressure} * \text{Braking efficiency}/\text{Tire radius}/\text{Vehicle weight} \qquad \text{Formula (6)}$$

Optionally, in the brake pressure determining step, the pre-braking pressure p1 is obtained based on the second slope estimated value $a_{estimate2}$, the vehicle weight, and a braking efficiency coefficient according to the following formula (7):

Pre-braking pressure $p1$=(Second slope estimated value $a_{estimate2}$*Vehicle weight*Tire radius)/Braking efficiency     Formula (7), and the pre-braking pressure p2 is obtained based on the third slope estimated value $a_{estimate3}$, the vehicle weight, and the braking efficiency coefficient according to the following formula (8):

In-braking pressure $p2$=(Third slope estimated value $a_{estimate3}$*Vehicle weight*Tire radius)/Braking efficiency     Formula (8).

A slope brake pressure determining system according to an aspect of the invention includes:

a pre-braking slope determining module, configured to determine a pre-braking slope estimated value according to a specified cycle, where vehicle acceleration $a_{wheel}$ is determined based on a current vehicle speed, a slope measured value $a_{measure}$ is obtained based on a measured value of the vehicle acceleration, and a current pre-braking slope estimated value is determined based on the vehicle acceleration $a_{wheel}$ and the slope measured value $a_{measure}$ and is used as a first slope estimated value $a_{estimate1}$, and where a pre-braking slope estimated value of a previous cycle that is latched prior to the establishment of brake pressure is used as a second slope estimated value $a_{estimate2}$;

an in-braking slope determining module, configured to latch an instantaneous vehicle speed $v_{brake}$ prior to the establishment of the brake pressure, accumulate a vehicle traveling distance $l_{brake}$ and time $t_{brake}$, and determine an in-braking slope estimated value $a_{slop}$ based on the instantaneous vehicle speed $v_{brake}$ prior to the establishment of the brake pressure and the vehicle traveling distance $l_{brake}$ and time $t_{brake}$, where the instantaneous vehicle speed $v_{brake}$ is an instantaneous vehicle speed when the brake is applied, and the vehicle traveling distance $l_{brake}$ and time $t_{brake}$ are a vehicle traveling distance and time that have been accumulated from a moment at which the brake is applied; and a brake pressure determining module, configured to determine pre-braking pressure p1 and in-braking pressure p2 based on the second slope estimated value $a_{estimate2}$ and a third slope estimated value $a_{estimate3}$, respectively, determine initial brake pressure p3 based on the pre-braking pressure p1 and the in-braking pressure p2, and determine final brake pressure p4 based on the initial brake pressure p3, where the third slope estimated value $a_{estimate3}$ is a slope estimated value determined using an observer.

Optionally, in the pre-braking slope determining module, the current first slope estimated value $a_{estimate1}$ is determined according to the following formula (1):

$a_{estimate1} = a_{measure} - a_{wheel}$     Formula (1), where the slope estimated value is determined according to the specified cycle, and the second slope estimated value $a_{estimate2}$ of the previous cycle is latched prior to the establishment of the brake pressure;

in the in-braking slope determining module, the in-braking slope estimated value $a_{slop}$ is determined according to the following formula (2):

$a_{slop} = a_{brake} - (l_{brake} - v_{brake}*t_{brake})/(0.5*t_{brake}*t_{brake})$     Formula (2), where $a_{brake}$ is acceleration formed by a braking force, and the acceleration $a_{brake}$ formed by the braking force is calculated based on brake pressure, braking efficiency, a vehicle radius, and a vehicle weight; and in the brake pressure determining module, the initial brake pressure p3 is calculated according to the following formula (4):

$p3 = \max\{p1, p2\}$     Formula (4), and the final brake pressure p4 is calculated according to the following formula (5):

$p4 = p3 + \Sigma p_{detal}$     Formula (5), where $\Sigma p_{detal}$ is a specified variable.

Optionally, in the pre-braking slope determining module, the vehicle speed is obtained from a wheel speed sensor, and the measured value of the vehicle acceleration is obtained from a vehicle body acceleration sensor and undergoes second-order filtering to obtain the slope measured value $a_{measure}$.

Optionally, in the pre-braking slope determining module, on the premise of identifying a braking condition, the second slope estimated value $a_{estimate2}$ of the previous cycle is latched prior to the establishment of the brake pressure, where identifying the braking condition includes identifying according to stop and deceleration commands from a vehicle brake switch or a vehicle main controller.

Optionally, in the in-braking slope determining module, the instantaneous vehicle speed $v_{brake}$ prior to the establishment of the brake pressure is obtained from a wheel speed sensor, the vehicle traveling distance $l_{brake}$ is obtained by integration on the wheel speed sensor, the time $t_{brake}$ is obtained by timing, and the acceleration $a_{brake}$ formed by the braking force is calculated according to the following formula (6):

$a_{brake}$=Brake pressure*Braking efficiency/Tire radius/Vehicle weight     Formula (6)

Optionally, in the brake pressure determining module, the pre-braking pressure p1 is obtained by calculation based on the second slope estimated value $a_{estimate2}$, the vehicle weight, and a braking efficiency coefficient according to the following formula (7):

Pre-braking pressure $p1$=(Second slope estimated value $a_{estimate2}$*Vehicle weight*Tire radius)/Braking efficiency     Formula (7), and the pre-braking pressure p2 is obtained based on the third slope estimated value $a_{estimate3}$, the vehicle weight, and the braking efficiency coefficient according to the following formula (8):

In-braking pressure $p2$=(Third slope estimated value $a_{estimate3}$*Vehicle weight*Tire radius)/Braking efficiency     Formula (8).

A computer-readable medium according to an aspect of the invention has a computer program stored thereon, where when the computer program is executed by a processor, the slope brake pressure determining method of any one of claims 1 to 5 is implemented.

A computer device according to an aspect of the invention includes a storage module, a processor, and a computer program stored on the storage module and capable of running on the processor, where when the computer program is executed by the processor, the foregoing slope brake pressure determining method is implemented.

A vehicle according to an aspect of the invention includes: the foregoing slope brake pressure determining system.

As described above, according to the slope brake pressure determining method and the slope brake pressure determining system of the invention, a pre-braking slope estimated value and an in-braking slope estimated value are determined for a pre-braking case and an in-braking case, respectively; then, pre-braking pressure p1 and in-braking pressure p2 are determined based on the pre-braking slope estimated value and the in-braking slope estimated value; and finally, final brake pressure p4 is obtained by calculation based on the pre-braking pressure p1 and the in-braking pressure p2. Since different physical quantities and different operating conditions are used for slope estimation, the reliability of the slope estimated value is improved.

Moreover, the following technical effects can be obtained by calculating the pre-braking pressure p1, the in-braking pressure p2, and the final brake pressure p4: The calculation of the pre-braking pressure ensures that the brake pressure value is not too large or too small, thereby ensuring braking comfort; the calculation of the brake pressure during braking dynamically adjusts the brake pressure value based on actual operation of the vehicle, thereby ensuring a braking distance; and the calculation of the final brake pressure after braking ensures the protection against slipping of the vehicle on the slope.

DETAILED DESCRIPTION OF EMBODIMENTS

Some of the embodiments of the invention are described below and are intended to provide a basic understanding of the invention. They are not intended to confirm key or decisive elements of the invention or limit the scope of protection.

For concise and illustrative purposes, this specification mainly describes the principles of the invention with reference to its exemplary embodiments. However, those skilled in the art will readily recognize that the same principles can be equivalently applied to all types of slope brake pressure determining methods and slope brake pressure determining systems, and the same principles can be implemented therein. Any such changes do not depart from the true spirit and scope of this patent application.

Moreover, in the following description, reference is made to the accompanying drawings, which illustrate specific exemplary embodiments. Electrical, mechanical, logical, and structural changes can be made to these embodiments without departing from the spirit and scope of the invention. Furthermore, although the features of the invention are disclosed in combination with only one of several implementations/embodiments, if any given or recognizable function may be desired and/or advantageous, this feature can be combined with one or more other features of other implementations/embodiments. Therefore, the following description should not be considered in a limiting sense, and the scope of the invention is defined by the appended claims and their equivalents.

The terms such as "have" and "include" indicate that in addition to the units (modules) and steps that are directly and clearly described in the specification and the claims, other units (modules) and steps that are not directly or clearly described are not excluded in the technical solutions of the invention.

Before the description of a slope brake pressure determining method and a slope brake pressure determining system of the invention, the concept of the invention is described first.

The main inventive concept of the invention lies in that, a pre-braking slope estimated value and an in-braking slope estimated value are determined for a pre-braking case and an in-braking case, respectively; then, pre-braking pressure p1 and in-braking pressure p2 are determined based on the pre-braking slope estimated value and the in-braking slope estimated value; and finally, final brake pressure p4 is obtained by calculation based on the pre-braking pressure p1 and the in-braking pressure p2. In this way, it can be ensured that the brake pressure can be accurately determined under different working conditions.

Figure 1:
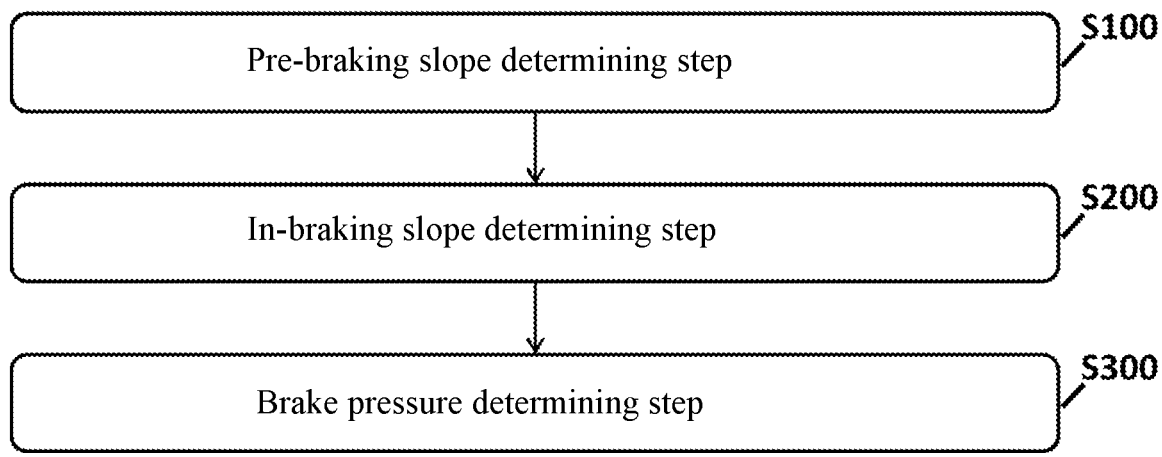
FIG. 1 is a schematic flowchart of a slope brake pressure determining method according to an aspect of the invention.

FIG. 1 is a schematic flowchart of a slope brake pressure determining method according to an aspect of the invention.

As shown in FIG. 1, the slope brake pressure determining method of an aspect of the invention includes the following steps: a pre-braking slope determining step S100, an in-braking slope determining step S200, and a brake pressure determining step S300. These steps are specifically as follows:

In the pre-braking slope determining step S100, a pre-braking slope estimated value is determined according to a specified cycle, where vehicle acceleration $a_{wheel}$ is determined based on a current vehicle speed, a slope measured value $a_{measure}$ is obtained based on a measured value of the vehicle acceleration, and a current pre-braking slope estimated value is determined based on the vehicle acceleration $a_{wheel}$ and the slope measured value $a_{measure}$ and is used as a first slope estimated value $a_{estimate1}$, and where a pre-braking slope estimated value of a previous cycle that is latched prior to the establishment of brake pressure is used as a second slope estimated value $a_{estimate2}$. In the pre-braking slope determining step S100, the first slope estimated value $a_{estimate1}$ is determined according to the following formula (1):

$$a_{estimate1} = a_{measure} - a_{wheel} \qquad \text{Formula (1).}$$

The slope estimated value is determined according to the specified cycle, and the second slope estimated value $a_{estimate2}$ of the previous cycle is latched prior to the establishment of the brake pressure. In addition, the second slope estimated value $a_{estimate2}$ is determined by using the same method as the first slope estimated value $a_{estimate1}$.

In the pre-braking slope determining step S100, the current vehicle speed is obtained from a wheel speed sensor, and the measured value of the vehicle acceleration is obtained from a vehicle body acceleration sensor and undergoes second-order filtering to obtain the slope measured value $a_{measure}$. The second-order filtering is performed here because the acceleration sensor fluctuates greatly, and its transfer function is similar to the second-order filtering. Therefore, a more accurate value can be obtained through the second-order filtering.

In the pre-braking slope determining step S100, on the premise of identifying a braking condition, the second slope estimated value $a_{estimate2}$ of the previous cycle is latched prior to the establishment of the brake pressure, where identifying the braking condition includes: identifying according to stop and deceleration commands from a vehicle brake switch or a vehicle main controller. Herein, since different physical quantities and different operating conditions are used for slope estimation, the reliability of the slope estimated value is improved.

In the in-braking slope determining step S200, an instantaneous vehicle speed $v_{brake}$ prior to the establishment of the brake pressure is latched, and a vehicle traveling distance $l_{brake}$ and time $t_{brake}$ are accumulated, where the instantaneous vehicle speed $v_{brake}$ is an instantaneous vehicle speed when the brake is applied, and is obtained by a wheel speed sensor, the vehicle traveling distance $l_{brake}$ is obtained by integration on the wheel speed sensor, and the time $t_{brake}$ is obtained by timing, for example, timing by a controller; and an in-braking slope estimated value $a_{slop}$ is determined according to the following formula (2):

$$a_{slop} = a_{brake} - (l_{brake} - v_{brake} * t_{brake})/(0.5 * t_{brake} * t_{brake}) \quad \text{Formula (2)},$$

where $a_{brake}$ is acceleration formed by a braking force, and the acceleration $a_{brake}$ formed by the braking force is calculated based on brake pressure, braking efficiency, a vehicle radius, and a vehicle weight.

In the brake pressure determining step S300, pre-braking pressure p1 and in-braking pressure p2 are obtained by calculation based on the second slope estimated value $a_{estimate2}$, a third slope estimated value $a_{estimate3}$, the vehicle weight, and a braking efficiency coefficient, where the third slope estimated value $a_{estimate3}$ is a slope estimated value determined using an observer.

The observer is an algorithm in the control theory, that is, to calculate a measurable value according to a theoretical formula, modify a coefficient to approximate the theoretical calculated value to an actually measured value, and indirectly estimate an unmeasurable value in the theoretical formula. Here, a Luenberger observer can be used as the observer.

Initial brake pressure p3 is calculated according to the following formula (4):

$$p3 = \max\{p1, p2\} \quad \text{Formula (4)}.$$

Final brake pressure p4 is calculated according to the following formula (5):

$$p4 = p3 + \Sigma p_{detal} \quad \text{Formula (5)},$$

where $\Sigma p_{detal}$ is a specified variable.

In the in-braking slope determining step S200, the vehicle speed $v_{brake}$ prior to the establishment of the brake pressure is obtained from the wheel speed sensor, and the acceleration $a_{brake}$ formed by the braking force is calculated according to the following formula (6):

$$a_{brake} = \text{Brake pressure} * \text{Braking efficiency}/\text{Tire radius}/\text{Vehicle weight} \quad \text{Formula (6)}.$$

Figure 2:
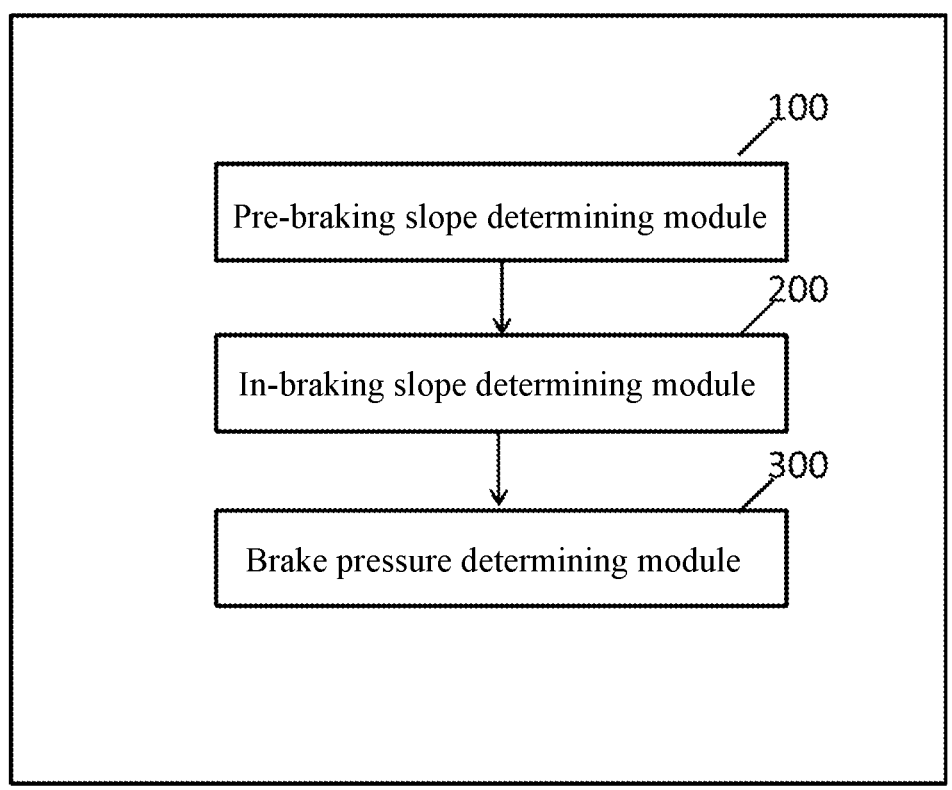
FIG. 2 is a structural block diagram of a slope brake pressure determining system according to an aspect of the invention.

In the brake pressure determining step S300, the pre-braking pressure p1 is obtained by calculation based on the second slope estimated value $a_{estimate2}$, the vehicle weight, and a braking efficiency coefficient according to the following formula (7):

Pre-braking pressure $p1 = (\text{Second slope estimated value } a_{estimate2} * \text{Vehicle weight} * \text{Tire radius})/\text{Braking efficiency} \quad \text{Formula (7)},$ and the pre-braking pressure p2 is obtained based on the third slope estimated value $a_{estimate3}$, the vehicle weight, and the braking efficiency coefficient according to the following formula (8):

In-braking pressure $p2 = (\text{Third slope estimated value } a_{estimate3} * \text{Vehicle weight} * \text{Tire radius})/\text{Braking efficiency} \quad \text{Formula (8)}.$ FIG. 2 is a structural block diagram of a slope brake pressure determining system according to an aspect of the invention.

As shown in FIG. 2, the slope brake pressure determining system according to an aspect of the invention includes: a pre-braking slope determining module 100, an in-braking slope determining module 200, and a brake pressure determining module 300. The following separately describes functions implemented by the pre-braking slope determining module 100, the in-braking slope determining module 200, and the brake pressure determining module 300.

The pre-braking slope determining module 100 is configured to determine a pre-braking slope estimated value according to a specified cycle, where vehicle acceleration $a_{wheel}$ is determined based on a current vehicle speed, a slope measured value $a_{measure}$ is obtained based on a measured value of the vehicle acceleration, and a current pre-braking slope estimated value is determined based on the vehicle acceleration $a_{wheel}$ and the slope measured value $a_{measure}$ and is used as a first slope estimated value $a_{estimate1}$, and where a pre-braking slope estimated value of a previous cycle that is latched prior to the establishment of brake pressure is used as a second slope estimated value $a_{estimate2}$.

In the pre-braking slope determining module 100, the first slope estimated value $a_{estimate1}$ is determined according to the following formula (1):

$$a_{estimate1} = a_{measure} - a_{wheel} \quad \text{Formula (1)}$$

The in-braking slope determining module 200 is configured to latch a vehicle speed $v_{brake}$ prior to the establishment of the brake pressure, and accumulate a vehicle traveling distance $l_{brake}$ and time $t_{brake}$, where the instantaneous vehicle speed $v_{brake}$ is an instantaneous vehicle speed when the brake is applied, and is obtained by a wheel speed sensor, the vehicle traveling distance $l_{brake}$ is obtained by integration on the wheel speed sensor, and the time $t_{brake}$ is obtained by timing, for example, timing by a controller; and determine an in-braking slope estimated value $a_{slop}$ according to the following formula (2):

$$a_{slop} = a_{brake} - (l_{brake} - v_{brake} * t_{brake})/(0.5 * t_{brake} * t_{brake}) \quad \text{Formula (2)},$$

where $a_{brake}$ is acceleration formed by a braking force, and the acceleration $a_{brake}$ formed by the braking force is calculated based on brake pressure, braking efficiency, a vehicle radius, and a vehicle weight.

The brake pressure determining module 300 is configured to obtain pre-braking pressure p1 and in-braking pressure p2 by calculation based on the second slope estimated value $a_{estimate2}$, the third slope estimated value $a_{estimate3}$, the vehicle weight, and a braking efficiency coefficient, where $a_{estimate3}$ is a slope estimated value determined using an observer.

Initial brake pressure p3 is calculated according to the following formula (4):

$$p3 = \max\{p1, p2\} \quad \text{Formula (4)}.$$

Final brake pressure p4 is calculated according to the following formula (5):

$$p4 = p3 + \Sigma p_{detal} \quad \text{Formula (5)},$$

where $\Sigma p_{detal}$ is a specified variable.

In the pre-braking slope determining module 100, the current vehicle speed is obtained from a wheel speed sensor, and the measured value of the vehicle acceleration is obtained from a vehicle body acceleration sensor and undergoes second-order filtering to obtain the slope measured value $a_{measure}$.

In the pre-braking slope determining module 100, on the premise of identifying a braking condition, the second slope estimated value $a_{estimate2}$ of the previous cycle is latched prior to the establishment of the brake pressure, where identifying the braking condition includes: identifying according to stop and deceleration commands from a vehicle brake switch or a vehicle main controller.

In the in-braking slope determining module 200, the vehicle speed $v_{brake}$ prior to the establishment of the brake pressure is obtained from the wheel speed sensor, and the acceleration $a_{brake}$ formed by the braking force is calculated according to the following formula (6):

$$a_{brake} = \text{Brake pressure} * \text{Braking efficiency} / \text{Tire radius} / \text{Vehicle weight} \quad \text{Formula (6)}$$

In the brake pressure determining module 300, the pre-braking pressure p1 is obtained by calculation based on the second slope estimated value $a_{estimate2}$, the vehicle weight, and a braking efficiency coefficient according to the following formula (7):

$$\text{Pre-braking pressure } p1 = (\text{Second slope estimated value } a_{estimate2} * \text{Vehicle weight} * \text{Tire radius}) / \text{Braking efficiency} \quad \text{Formula (7), and}$$

the pre-braking pressure p2 is obtained based on the third slope estimated value $a_{estimate3}$, the vehicle weight, and the braking efficiency coefficient according to the following formula (8):

$$\text{In-braking pressure } p2 = (\text{Third slope estimated value } a_{estimate3} * \text{Vehicle weight} * \text{Tire radius}) / \text{Braking efficiency} \quad \text{Formula (8).}$$

According to the slope brake pressure determining method and the slope brake pressure determining system of the invention, a pre-braking slope estimated value and an in-braking slope estimated value are determined for a pre-braking case and an in-braking case, respectively; then, pre-braking pressure p1 and in-braking pressure p2 are determined based on the pre-braking slope estimated value and the in-braking slope estimated value; and finally, final brake pressure p4 is obtained by calculation based on the pre-braking pressure p1 and the in-braking pressure p2. Since different physical quantities and different operating conditions are used for slope estimation, the reliability of the slope estimated value is improved.

Moreover, the following technical effects can be obtained by calculating the pre-braking pressure p1, the in-braking pressure p2, and the final brake pressure p4: The calculation of the pre-braking pressure ensures that the brake pressure value is not too large or too small, thereby ensuring braking comfort; the calculation of the brake pressure during braking dynamically adjusts the brake pressure value based on actual operation of the vehicle, thereby ensuring a braking distance; and the calculation of the final brake pressure after braking ensures the protection against slipping of the vehicle on the slope.

The invention further provides a computer-readable medium having a computer program stored thereon, where when the computer program is executed by a processor, the foregoing slope brake pressure determining method is implemented.

The invention further provides a computer device, including a storage module, a processor, and a computer program stored on the storage module and capable of running on the processor, where when the computer program is executed by the processor, the foregoing slope brake pressure determining method is implemented.

The invention further provides a vehicle, including the foregoing slope brake pressure determining system.

The foregoing examples mainly illustrate the slope brake pressure determining method and the slope brake pressure determining system of the invention. Although only some of the specific implementations of the invention have been described, those of ordinary skill in the art should understand that the invention can be implemented in many other forms without departing from the essence and scope of the invention. Therefore, the presented examples and implementations are considered to be schematic rather than restrictive, and without departing from the spirit and scope of the invention that are defined by the appended claims, the invention may cover various changes and replacements.

The invention claimed is:

1. A slope brake pressure determining method, comprising:

a pre-braking slope determining step, in which a pre-braking slope estimated value is determined according to a specified cycle, wherein vehicle acceleration $a_{wheel}$ is determined based on a current vehicle speed, a slope measured value $a_{measure}$ is obtained based on a measured value of the vehicle acceleration, and a current pre-braking slope estimated value is determined based on the vehicle acceleration $a_{wheel}$ and the slope measured value $a_{measure}$ and is used as a first slope estimated value $a_{estimate1}$, and wherein a pre-braking slope estimated value of a previous cycle that is latched prior to the establishment of brake pressure is used as a second slope estimated value $a_{estimate2}$;

an in-braking slope determining step, in which an instantaneous vehicle speed $v_{brake}$ prior to the establishment of the brake pressure is latched, a vehicle traveling distance $l_{brake}$ and time $t_{brake}$ are accumulated, and an in-braking slope estimated value $a_{slop}$ is determined based on the instantaneous vehicle speed $v_{brake}$ prior to the establishment of the brake pressure and the vehicle traveling distance $l_{brake}$ and time $t_{brake}$, wherein the instantaneous vehicle speed $v_{brake}$ is an instantaneous vehicle speed when a brake is applied, and the vehicle traveling distance $l_{brake}$ and time $t_{brake}$ are a vehicle traveling distance and time that have been accumulated from a moment at which the brake is applied, wherein, in the pre-braking slope determining step, on a premise of identifying a braking condition, the pre-braking slope estimated value of the previous cycle, namely the second slope estimated value $a_{estimate2}$, is latched prior to the establishment of the brake pressure, and wherein identifying the braking condition comprises identifying according to stop and deceleration commands from a vehicle brake switch or a vehicle main controller; and a brake pressure determining step, in which pre-braking pressure p1 and in-braking pressure p2 are determined based on the second slope estimated value $a_{estimate2}$ and a third slope estimated value $a_{estimate3}$, respectively, initial brake pressure p3 is determined based on the pre-braking pressure p1 and the in-braking pressure p2, and final brake pressure p4 is determined based on the initial brake pressure p3, wherein the third slope estimated value $a_{estimate3}$ is a slope estimated value determined using an observer.

2. The slope brake pressure determining method of claim 1, wherein in the pre-braking slope determining step, the first slope estimated value $a_{estimate1}$ is determined according to the following formula (1):

$$a_{estimate1} = a_{measure} - a_{wheel} \quad \text{Formula (1);}$$

in the in-braking slope determining step, the in-braking slope estimated value $a_{slop}$ is determined according to the following formula (2):

$$a_{slop}=a_{brake}-(l_{brake}-v_{brake}*t_{brake})/(0.5*t_{brake}*t_{brake}) \quad \text{Formula (2)},$$

where $a_{brake}$ is acceleration formed by a braking force, and the acceleration $a_{brake}$ formed by the braking force is calculated based on brake pressure, braking efficiency, a vehicle radius, and a vehicle weight; and in the brake pressure determining step, the initial brake pressure p3 is obtained according to the following formula (4):

$$p3=\max\{p1,p2\} \quad \text{Formula (4), and}$$

the final brake pressure p4 is obtained according to the following formula (5):

$$p4=p3+\Sigma p_{detal} \quad \text{Formula (5)},$$

where $\Sigma p_{detal}$ is a specified variable.

3. The slope brake pressure determining method of claim 2, wherein
in the pre-braking slope determining step, the current vehicle speed is obtained from a wheel speed sensor, and the measured value of the vehicle acceleration is obtained from a vehicle body acceleration sensor and undergoes second-order filtering to obtain the slope measured value $a_{measure}$.

4. The slope brake pressure determining method of claim 2, wherein
in the in-braking slope determining step, the instantaneous vehicle speed $v_{brake}$ is obtained from a wheel speed sensor, the vehicle traveling distance $l_{brake}$ is obtained by integration on the wheel speed sensor, the time $t_{brake}$ is obtained by timing, and the acceleration $a_{brake}$ formed by the braking force is obtained according to the following formula (6):

$$a_{brake}=\text{Brake pressure}*\text{Braking efficiency/Tire radius/}$$
$$\text{Vehicle weight} \quad \text{Formula (6)}.$$

5. The slope brake pressure determining method of claim 2, wherein
in the brake pressure determining step, the pre-braking pressure p1 is obtained based on the second slope estimated value $a_{estimate2}$, the vehicle weight, and a braking efficiency coefficient according to the following formula (7):

Pre-braking pressure $p1$=(Second slope estimated value $a_{estimate2}$*Vehicle weight*Tire radius)/
Braking efficiency  Formula (7), and the pre-braking pressure p2 is obtained based on the third slope estimated value $a_{estimate3}$, the vehicle weight, and the braking efficiency coefficient according to the following formula (8):

the pre-braking pressure $p2$=(Third slope estimated value $a_{estimate3}$*Vehicle weight*Tire radius)/
Braking efficiency  Formula (8).

6. A slope brake pressure determining system, comprising:
a pre-braking slope determining module, configured to determine a pre-braking slope estimated value according to a specified cycle, wherein vehicle acceleration $a_{wheel}$ is determined based on a current vehicle speed, a slope measured value $a_{measure}$ is obtained based on a measured value of the vehicle acceleration, and a current pre-braking slope estimated value is determined based on the vehicle acceleration $a_{wheel}$ and the slope measured value $a_{measure}$ and is used as a first slope estimated value $a_{estimate1}$, and wherein a pre-braking slope estimated value of a previous cycle that is latched prior to the establishment of brake pressure is used as a second slope estimated value $a_{estimate2}$, wherein, in the pre-braking slope determining module, on a premise of identifying a braking condition, the second slope estimated value $a_{estimate2}$ of the previous cycle is latched prior to the establishment of the brake pressure, and wherein identifying the braking condition comprises identifying according to stop and deceleration commands from a vehicle brake switch or a vehicle main controller;

an in-braking slope determining module, configured to latch an instantaneous vehicle speed $v_{brake}$ prior to the establishment of the brake pressure, accumulate a vehicle traveling distance $l_{brake}$ and time $t_{brake}$, and determine an in-braking slope estimated value $a_{slop}$ based on the instantaneous vehicle speed $v_{brake}$ prior to the establishment of the brake pressure and the vehicle traveling distance $l_{brake}$ and time $t_{brake}$, wherein the instantaneous vehicle speed $v_{brake}$ is an instantaneous vehicle speed when a brake is applied, and the vehicle traveling distance $l_{brake}$ and time $t_{brake}$ are a vehicle traveling distance and time that have been accumulated from a moment at which the brake is applied; and a brake pressure determining module, configured to determine pre-braking pressure p1 and in-braking pressure p2 based on the second slope estimated value $a_{estimate2}$ and a third slope estimated value $a_{estimate3}$, respectively, determine initial brake pressure p3 based on the pre-braking pressure p1 and the in-braking pressure p2, and determine final brake pressure p4 based on the initial brake pressure p3, wherein the third slope estimated value $a_{estimate3}$ is a slope estimated value determined using an observer.

7. The slope brake pressure determining system of claim 6, wherein in the pre-braking slope determining module, the current first slope estimated value $a_{estimate1}$ is determined according to the following formula (1):

$$a_{estimate1}=a_{measure}-a_{wheel} \quad \text{Formula (1)},$$

wherein the slope estimated value is determined according to the specified cycle, and the second slope estimated value $a_{estimate2}$ of the previous cycle is latched prior to the establishment of the brake pressure;

in the in-braking slope determining module, the in-braking slope estimated value $a_{slop}$ is determined according to the following formula (2):

$$a_{slop}=a_{brake}-(l_{brake}-v_{brake}*t_{brake})/(0.5*t_{brake}*t_{brake}) \quad \text{Formula (2)},$$

where $a_{brake}$ is acceleration formed by a braking force, and the acceleration $a_{brake}$ formed by the braking force is calculated based on brake pressure, braking efficiency, a vehicle radius, and a vehicle weight; and in the brake pressure determining module, the initial brake pressure p3 is calculated according to the following formula (4):

$$p3=\max\{p1,p2\} \quad \text{Formula (4), and}$$

the final brake pressure p4 is calculated according to the following formula (5):

$$p4=p3+\Sigma p_{detal} \quad \text{Formula (5)},$$

where $\Sigma p_{detal}$ is a specified variable.

8. The slope brake pressure determining system of claim 7, wherein
in the pre-braking slope determining module, the vehicle speed is obtained from a wheel speed sensor, and the measured value of the vehicle acceleration is obtained from a vehicle body acceleration sensor and undergoes second-order filtering to obtain the slope measured value $a_{measure}$.

9. The slope brake pressure determining system of claim 7, wherein
in the in-braking slope determining module, the instantaneous vehicle speed $v_{brake}$ prior to the establishment of the brake pressure is obtained from a wheel speed sensor, the vehicle traveling distance $l_{brake}$ is obtained by integration on the wheel speed sensor, the time $t_{brake}$ is obtained by timing, and the acceleration $a_{brake}$ formed by the braking force is calculated according to the following formula (6):

$$a_{brake} = \text{Brake pressure} * \text{Braking efficiency} / \text{Tire radius} / \text{Vehicle weight} \quad \text{Formula (6)}.$$

10. The slope brake pressure determining system of claim 7, wherein
in the brake pressure determining module, the pre-braking pressure p1 is obtained by calculation based on the second slope estimated value $a_{estimate2}$, the vehicle weight, and a braking efficiency coefficient according to the following formula (7):

$$\text{Pre-braking pressure } p1 = (\text{Second slope estimated value } a_{estimate2} * \text{Vehicle weight} * \text{Tire radius}) / \text{Braking efficiency} \quad \text{Formula (7)},$$

and the pre-braking pressure p2 is obtained based on the third slope estimated value $a_{estimate3}$, the vehicle weight, and the braking efficiency coefficient according to the following formula (8):

$$\text{the pre-braking pressure } p2 = (\text{Third slope estimated value } a_{estimate3} * \text{Vehicle weight} * \text{Tire radius}) / \text{Braking efficiency} \quad \text{Formula (8)}.$$

11. A vehicle, comprising: the slope brake pressure determining system of claim 6.

* * * * *